Figure 6:
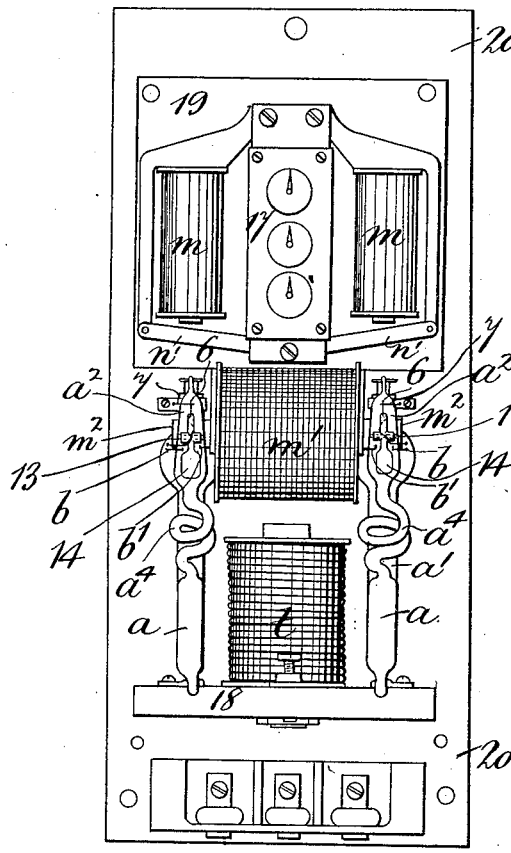

W. B. THORPE.
ELECTROLYTIC DEVICE.
APPLICATION FILED JAN. 12, 1909.
1,005,671.
Patented Oct. 10, 1911.
8 SHEETS—SHEET 1.
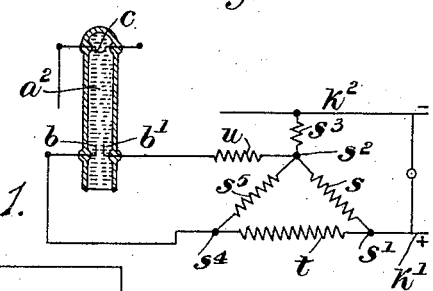
Fig. 2ᵃ
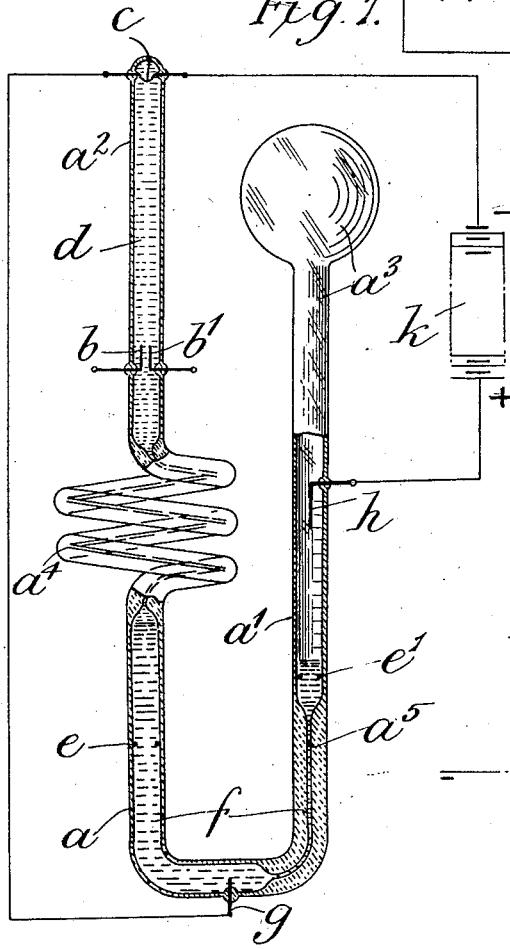
Fig. 1.
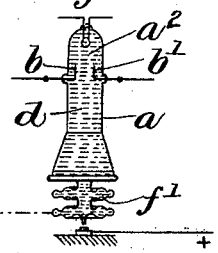
Fig. 12.
Witnesses:
E. R. Peck
A. W. Ehrling
Inventor:
Wilfred B. Thorpe
by Hubert E Peck
atty

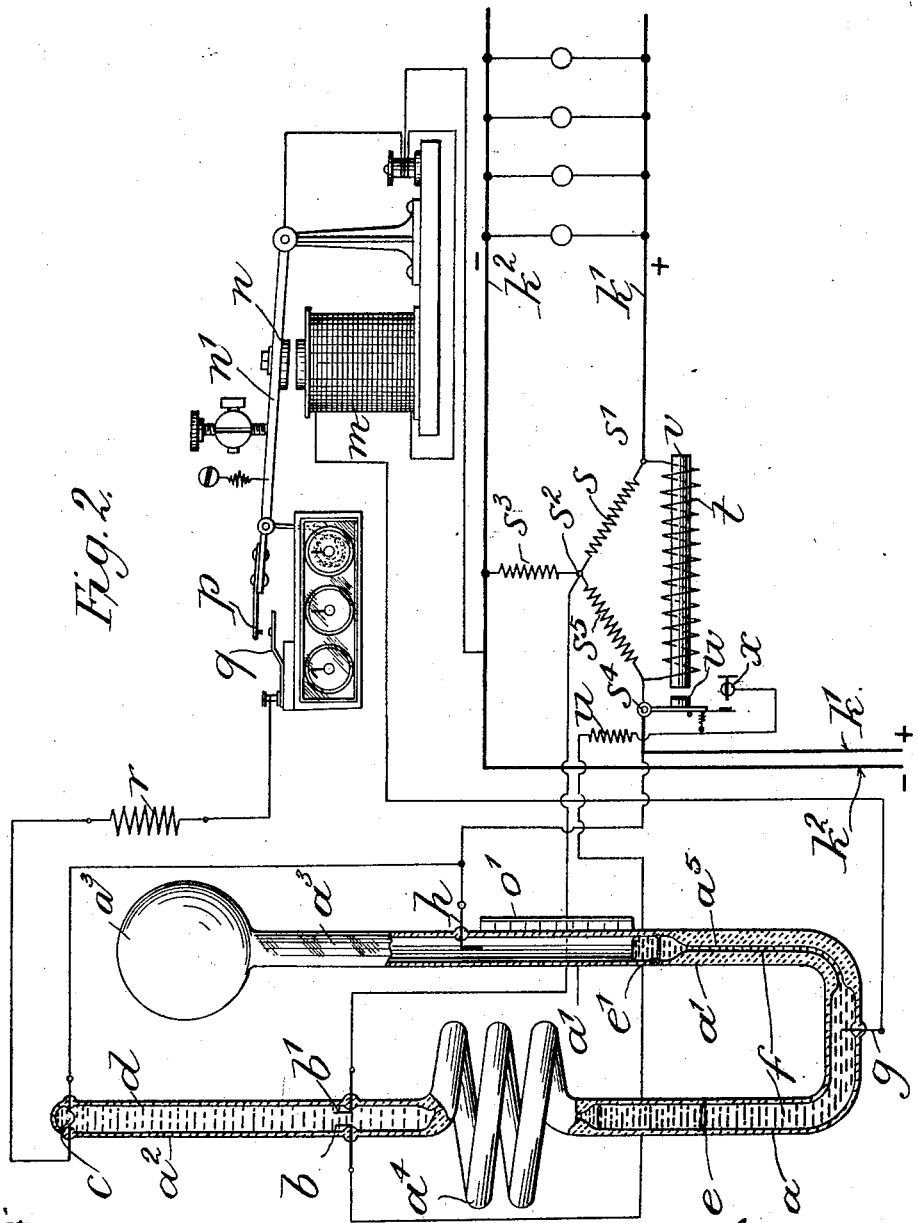

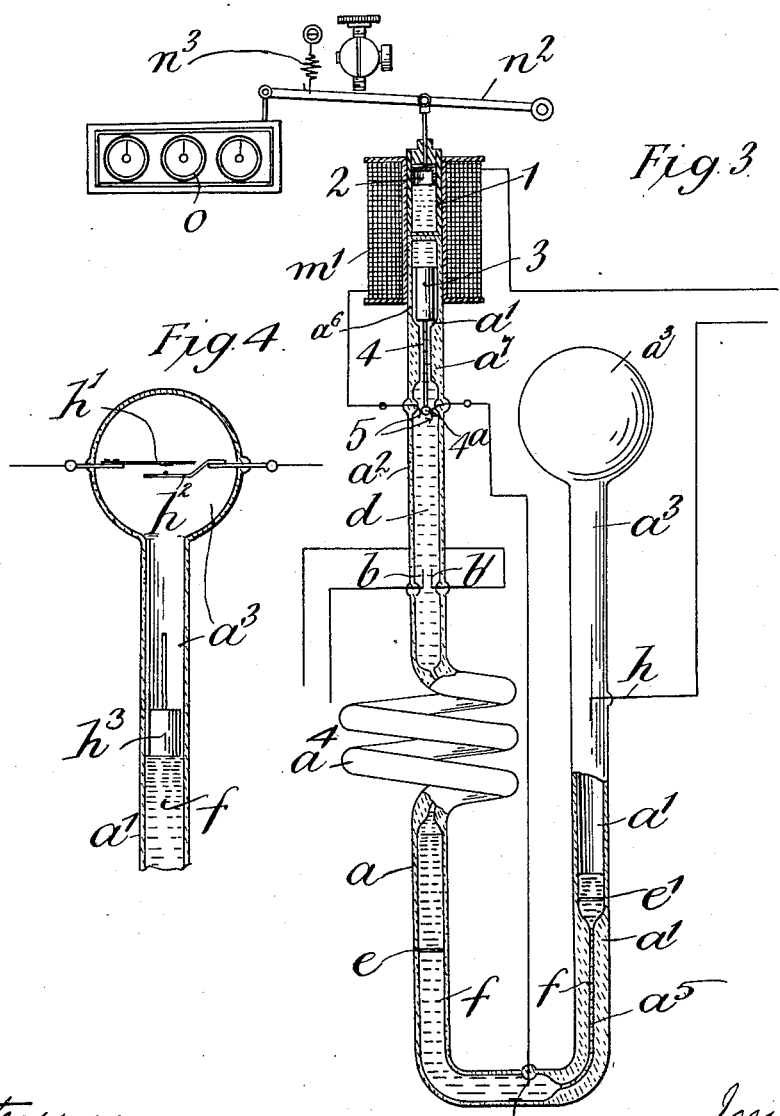

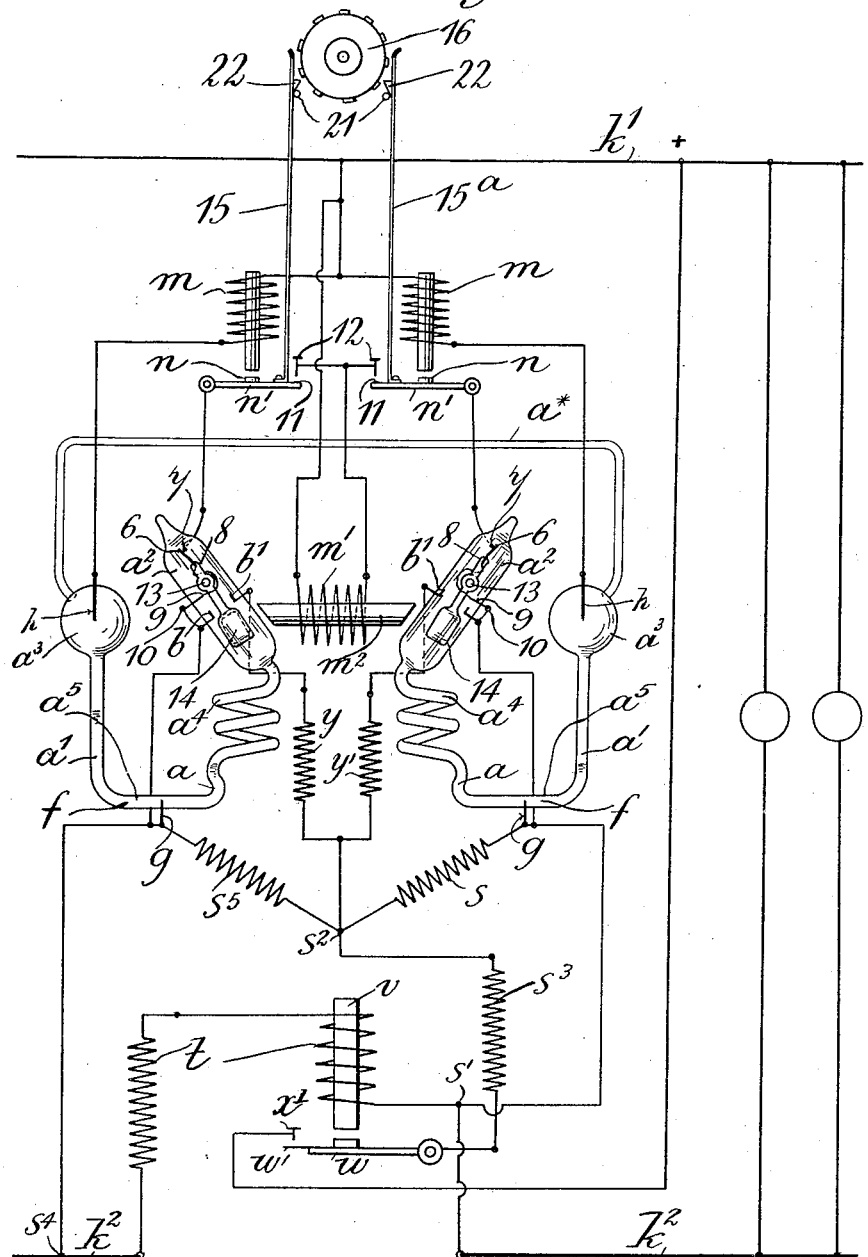

W. B. THORPE.
ELECTROLYTIC DEVICE.
APPLICATION FILED JAN. 12, 1909.

1,005,671.

Patented Oct. 10, 1911.
8 SHEETS—SHEET 5.

Witnesses:
E. R. Peck
A. W. Ehrling

Inventor:
Wilfred B Thorpe
by ____ atty

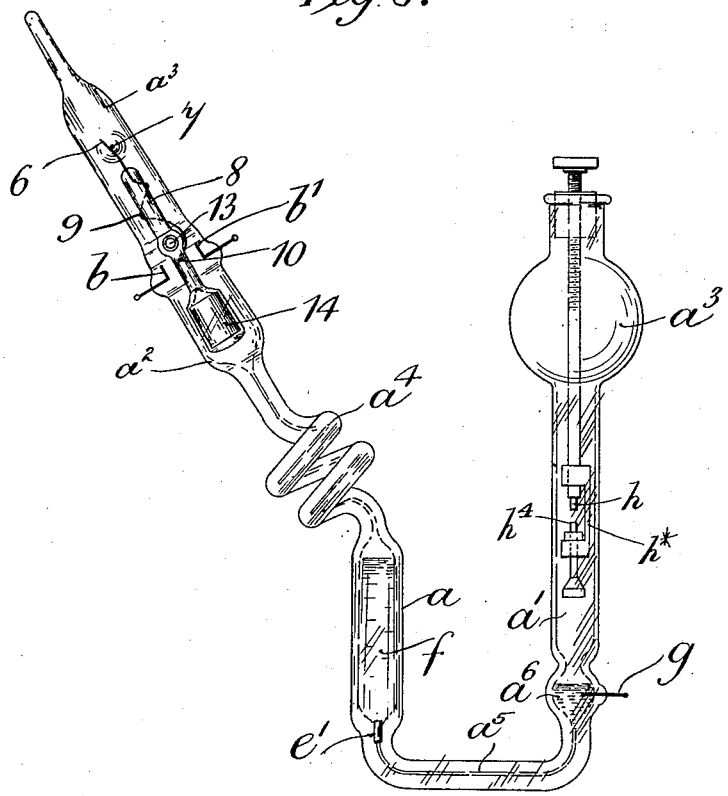

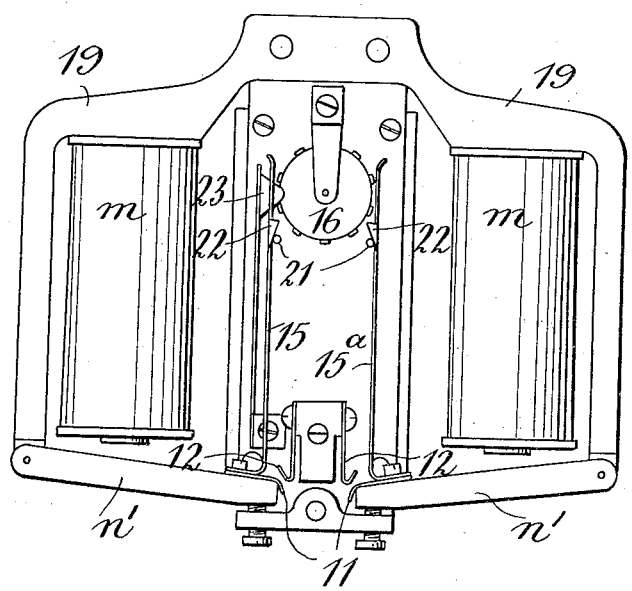
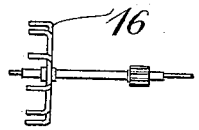

W. B. THORPE.
ELECTROLYTIC DEVICE.
APPLICATION FILED JAN. 12, 1909.

1,005,671.

Patented Oct. 10, 1911.
8 SHEETS—SHEET 8.

Witnesses:
E. R. Peck
A. W. Ehrling

Inventor:
Wilfred B Thorpe
by Hubert E Peck
Atty

UNITED STATES PATENT OFFICE.

WILFRED BERTRAM THORPE, OF BALHAM, LONDON, ENGLAND.

ELECTROLYTIC DEVICE.

1,005,671.   Specification of Letters Patent.   Patented Oct. 10, 1911.

Application filed January 12, 1909. Serial No. 471,936.

*To all whom it may concern:*

Be it known that I, WILFRED BERTRAM THORPE, a subject of the King of Great Britain and Ireland, residing at Balham, in the county of London, England, have invented Improvements in or Relating to Electrolytic Devices, of which the following is a specification.

For measuring electricity, it has heretofore been proposed to use in connection with a recording device, an electrolytic device through which the current to be measured is passed so as to cause electrolysis of a liquid, such as water, and the evolution of gases, such as oxygen and hydrogen, which are collected in a closed space or chamber and utilized to produce movement of a body, such as a column of mercury, which, upon the evolution of a predetermined volume of the gases, due to the passage of a definite quantity of electricity through the meter, is utilized to cause the operation of a heating or sparking device for bringing about the ignition and recombination of the gases to reconstitute the electrolyte decomposed, and also the operation of a recording device, the various operations being repeated from time to time so long as the meter continues in use. To compensate for the back electromotive force of the electrolyte used, it has been proposed to arrange an electric cell or other source of electromotive force in circuit with the electrolytic device, and also to place in the said circuit a metallic coil or equivalent device to compensate for the effects of variations in temperature of the electrolyte. Such electrolytic devices have not however heretofore been successful in practice and, so far as I know, they have never come into successful use for metering electricity. This has been due primarily to the fact that in such an electrolytic device, which usually comprises a bent tube or its equivalent, (hereinafter referred to as a tube) no provision has been made for preventing the evolved gases or electrolyte passing from the gas collecting chamber or cell at one end of the tube to the other end thereof past the liquid column in the tube, or of air passing in the reverse direction into the gas collecting chamber, according to which end of the tube contains the greater head of liquid, and no means have been provided to prevent evolution of gas at the surface of the liquid column next to the electrolyte, or the formation of objectionable substances at such surface, or the absorption of gas at such surface. Furthermore, the construction of such an electrolytic device has been such that its working is liable to variation with variations in the temperature of the external atmosphere.

Now the present invention has for object to avoid the above mentioned disadvantages and produce an electrolytic device specially suitable for use in the construction of electric meters and for other purposes.

The invention consists for this purpose in constructing the electrolytic device in such a manner that the movable piston or diaphragm (hereinafter called for brevity a piston) is caused to make a gas tight joint with the inner surface of the tube so as to effectually prevent gas or electrolyte creeping between the two; in rendering the piston, when of mercury, electrically negative by connecting it directly or indirectly to the negative pole of a source of electricity; and in interposing a high resistance between the electrolytic cell and the negatively electrified mercury piston so as to prevent any appreciable electric current flowing between them.

The invention also consists in various other novel features of construction and in combinations and arrangements of parts all as hereinafter more particularly described and pointed out in the claims.

Electrolytic devices embodying the various improvements hereinbefore set forth can be constructed in various forms and adapted in various ways to form switches, recorders, meters and other apparatus.

Figure 7:
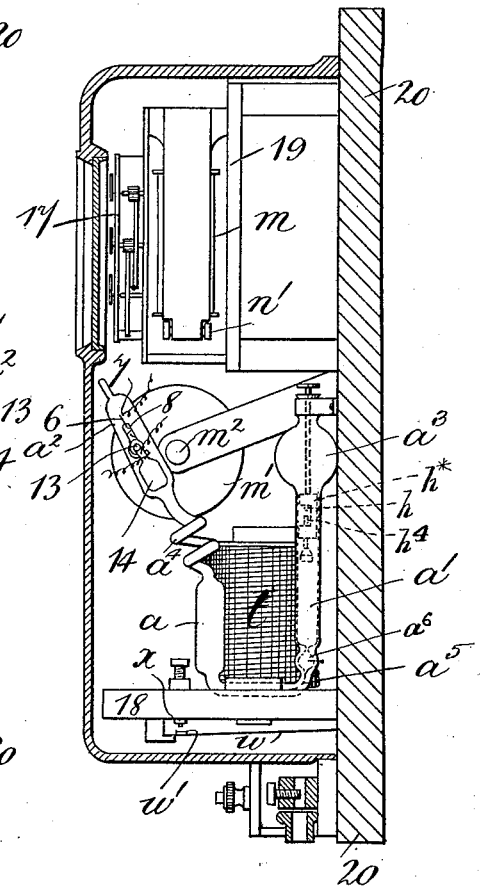
Figure 11:
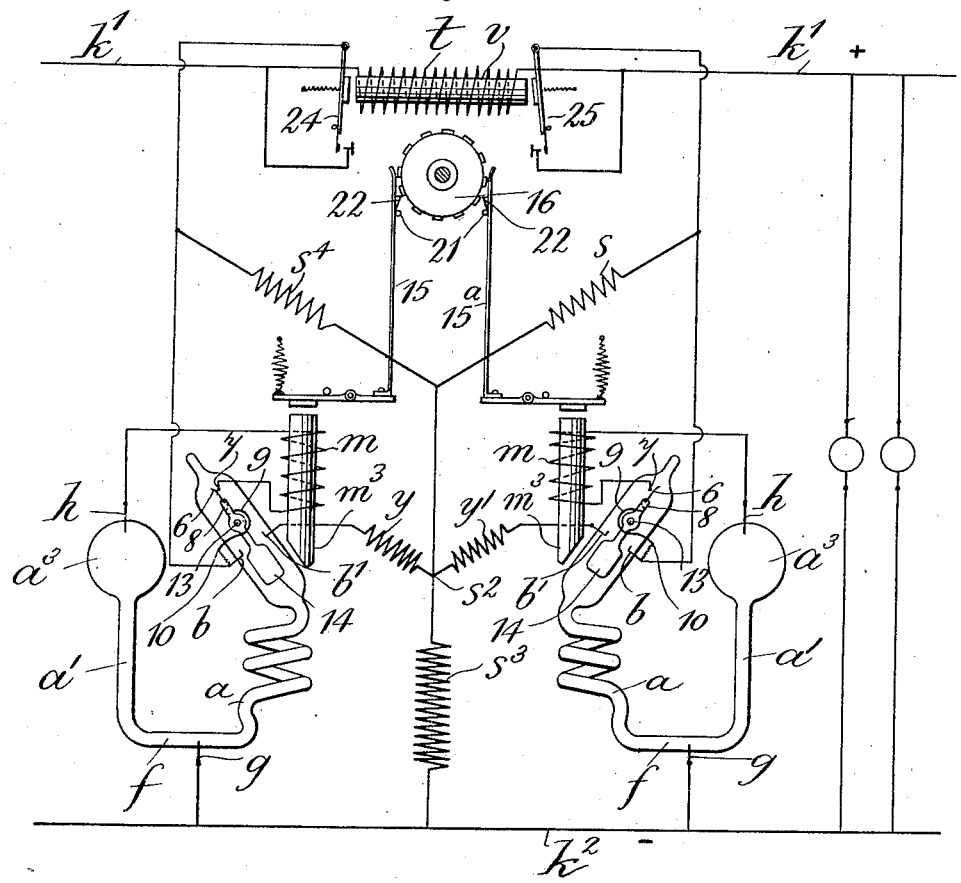

In the accompanying illustrative drawings, Figure 1 shows, diagrammatically, in front elevation, one construction of electrolytic device according to the present invention. Fig. 2 is a similar view to Fig. 1 showing the electrolytic device connected to an electric supply system and adapted to actuate a recording device so as to form a registering meter. Fig. 2ᵃ is a detail showing a modification. Fig. 3 is a similar view to Fig. 2 showing another modified arrangement. Fig. 4 is a detail view showing a further modification. Fig. 5 shows diagrammatically, a differential arrangement of electrolytic apparatus according to the invention. Fig. 6 shows in front elevation, with the cover removed, and Fig. 7 in side elevation with the cover in section, a differential arrangement of the kind shown in Fig. 5, adapted for use as a meter. Fig. 8 shows, in side elevation, one of the electrolytic tubes shown in Figs. 6 and 7. Fig. 9 is a detail view showing, in front elevation, part of the recording mechanism and actuating mechanism used in the meter shown in Figs. 6 and 7. Fig. 10 is a side elevation of a toothed wheel used in such recording mechanism. Fig. 11 is a similar view to Fig. 5, showing a modified arrangement. Fig. 12 is a detail view showing another form of the electrolytic device.

The electrolytic device shown in Fig. 1 comprises a bent tube $a$ $a^1$ made of rigid material throughout, for example glass, and having its two end portions $a^2$ and $a^3$ sealed so as to form a hermetically closed tube so that the device shall be unaffected by variations in temperaure of the external atmosphere by reason of the fact that the gases evolved in one end of the tube and the air or other gases or gas in the other end portion of the tube will be simultaneously subjected to the same variations of temperature, and will consequently fail to produce any movement of the mercury column in the tube. The upper end portion $a^2$ of the leg $a$ is adapted to serve as a combined electrolytic cell, gas collecting chamber and ignition chamber, for which purposes it is made of suitable internal dimensions and provided at its lower portion with a pair of electrodes $b$, $b^1$, and at its upper end with an igniting device $c$. The igniting device $c$ is shown as a length of fine wire, which, as well as the elctrodes $b$ $b^1$, is made of metal, such as platinum, that will withstand the action of the electrolyte and the gases evolved therefrom, and is capable of being fused through the wall of the tube. The said upper portion $a^2$ of the tube (hereinafter called for brevity the electrolytic cell) is filled at starting, with an electrolyte $d$, for example acidulated water, or a solution of caustic alkali, from which only such gases, for example oxygen and hydrogen in the case of the elctrolytes mentioned, will be evolved by the electrolytic action of a current passing between the electrodes, as can be completely recombined, by the igniting device $c$, to reconstitute the electrolyte. The lower portion of the tube $a$ $a^1$ is charged with a liquid $f$, for example mercury, on which the elctrolyte $d$ rests. The upper closed end portion $a^3$ of the tube is provided with a bulb which, as well as the portion of the leg $a^1$ above the mercury $f$ (hereinafter collectively called for brevity the gas chamber) is filled with gas, such as air, nitrogen, or carbon dioxid. The bent tube is formed with capillary bores at $a^4$ and $a^5$, the former $a^4$ being filled with the electrolyte, which serves to place a high resistance between the electrodes $b$ $b^1$ and the mercury $f$, for the purpose hereinbefore stated, and the two capillary bores together serving to confine the mercury in the lower bent portion of the tube between them and prevent it being shaken about when the instrument is transferred from place to place. $g$ is a platinum contact fused through the wall of the lower part of the bent tube so as to be always in contact with the mercury $f$, and $h$ is a second platinum contact fused through the wall of the tube leg $a^1$ so as normally to be above the level of the mercury in that leg. $e$, $e^1$ are two pieces of metal, such as platinum, that extend completely around the inner surface of the tube and with which the mercury $f$ is found to form an effectual fluid tight joint without forming an amalgam therewith. In the example, the two pieces of metal $e$ $e^1$ consist of continuous platinum wire rings fused into the inner surface of the two legs $a$, $a^1$ of the bent tube at such positions as to be always in contact with the mercury $f$ for the purpose of insuring a gas tight joint between the mercury and tube in order to prevent gas creeping from either end portion of the bent tube to the other end portion thereof or of electrolyte creeping in the same way. When the electrolytic device is to be used, contact $g$ is connected to one end of the wire constituting the igniting device $c$ the other end of which is connected to the negative pole of a source of electric energy, represented by a battery $k$, so that the mercury $f$ is negatively electrified for the purpose hereinbefore stated. Contact $h$ is connected to the other or positive pole of the source of electric energy.

The action of the electrolytic device is as follows:—On current passing through the electrolyte $d$ between the electrodes $b$, $b^1$, gases are evolved which rise and collect in the upper part of the electrolytic cell $a^2$ and, acting through the electrolyte, force the mercury $f$ down the leg $a$ and up the leg $a^1$ of the bent tube until it makes connection with the contact $h$, whereupon the circuit of the battery $k$ is closed through the igniting device $c$ so as to heat the same to a sufficient temperature to ignite the mixture of gases in the tube $a$ and cause the gases to chemically recombine and reconstitute the electrolyte from which they were evolved. The vacuum thus formed in the cell $a^2$ will cause both the mercury $f$ and the electrolyte $d$ to flow back to their original positions in the tube ready for the action to be repeated. As will be seen, the electrolytic device constitutes an automatic switch that can be used for various purposes.

In the arrangement shown in Fig. 2, the electric circuit that is closed by the mercury $f$ coming into connection with contact $h$, is completed across positive and negative electric supply conductors $k^1$, $k^2$ respectively through an electro-magnetic device comprising, in the example shown, the winding $m$ of an electromagnet the armature $n$ of which is arranged to operate, through a lever $n^1$, a registering device $o$ each time the said circuit is completed, and also to close a switch $p$, $q$ and complete a circuit through the igniting wire $c$ and a resistance $r$ which are arranged in parallel with the electro-magnetic device $m$ $n$, the whole arrangement constituting an electrolytic meter. The electrodes $b$, $b^1$ in this case are, as usual in electrolytic meters, arranged to be connected in a shunt circuit across the ordinary main shunting resistance $t$. Owing to the back E. M. F. of water, it is necessary in the case where acidulated water, or an aqueous alkaline or a neutral solution is used as the electrolyte, to provide, as heretofore, a shunt arrangement comprising a resistance $s$ connected at one end $s^1$ to the positive supply conductor $k^1$ at the lamp side of the shunting resistance $t$, and at the other end $s^2$ to one end of a third resistance $s^3$ the other end of which is connected to the negative supply conductor $k^2$. The electrodes $b$, $b^1$ are connected between the point $s^4$ on the positive conductor $k^1$ that is on the dynamo side of the shunting resistance $t$ and the point $s^2$ of the resistance $s$. The latter resistance is so adjusted that under no load conditions, the voltage drop between the two points $s^1$ and $s^2$ is slightly higher than the back E. M. F. of the electrolyte used. As this voltage drop will vary with variation in the current passing through the shunting resistance $t$ to the lamps L, an additional resistance $s^5$ is connected directly between the points $s^2$ and $s^4$, such resistance being also so adjusted that the voltage drop between its ends is slightly higher than the back E. M. F. of the electrolyte used. As this resistance is connected in series with the resistance $s^3$ across the mains $k^1$, $k^2$ on the dynamo side of the shunting resistance $t$, its voltage drop will be unaffected by voltage drop in the shunting resistance $t$ and will be practically constant if the difference of potential between the mains $k^1$, $k^2$ be maintained practically constant. $u$ is a resistance, made preferably of copper, arranged in series with the electrodes $b$, $b^1$ in a known manner for the purpose of temperature correction. The main shunting resistance $t$ may be wound around an iron core $v$ arranged to pull up a small armature $w$ when the current passing through the said resistance attains say one tenth of an ampere, the armature being arranged to then connect the resistance $u$ to the positive supply conductor $k^1$ through a fixed contact $x$ and so complete the circuit of the electrodes $b$, $b^1$ and resistance $u$ and bring the electrodes into action. The electrolyte will then be decomposed into its constituent gases in proportion to the current consumed, owing to the difference in voltage between the electrodes being proportionate to the voltage drop in the main shunting resistance $t$. The gases evolved can be ignited or combined after any predetermined number of units of electricity have been used. If, for example, the gases are recombined after ten units of electricity have been supplied to a consumer, any suitable part of the bent tube $a$ $a^1$, preferably the leg $a^1$, may be provided with a scale $o^1$ to indicate ten units, so that by reading off the height of the mercury $f$ in the leg $a^1$ against the scale, it can be at once seen what proportion of ten units have been supplied since the last operation of the registering device $o$. When the meter is so adjusted that the voltage drop of the resistance $s^5$ is equal to the back E. M. F. of the electrolyte, as described, the resistance $u$ may, as shown in Fig. 2ª, be connected in series with the resistance $s^5$ between the point $s^2$ and the electrode $b^1$, and the core $v$, armature $w$ and contact $x$ omitted. The electrodes $b$, $b^1$ may obviously be connected, in the manner described, to the negative conductor $k^2$ instead of to the positive one $k^1$ as hereinafter described and shown in Fig. 5.

The dimensions of the electrolytic cell $a^2$ can be varied according to requirement. Conveniently, in the case where the gases evolved are to be ignited and the registering device operated for say each ten units of electricity delivered to a consumer, the tube $a$ may, for example, be about two inches in length and have an internal diameter of about three sixteenths of an inch. In this case the amount of electrolyte decomposed for each operation of the meter will be less than a single drop thereof. Care must be taken that the electrolyte contains no impurities that will cause the formation of gases that will not be recombined by the igniting device.

In the modified arrangement shown in Fig. 3, the evolved gases are fired by an electric spark produced inductively by a solenoid $m^1$. In this case the solenoid $m^1$ is provided with a stationary hollow core 1 charged with oil to act, in conjunction with an iron plunger 2 connected to the lever $n^2$, as a dashpot. 3 is an iron core sealed in glass or other suitable material to prevent it oxidizing and arranged in an upper extension $a^6$ of the electrolytic cell $a^2$ that extends into the solenoid and is sealed at its upper end, its lower end being connected by a short length $a^7$ of capillary tube to the said cell $a^2$. To the core 3 is connected a rod 4 of suitable metal or material, for example platinum, that extends through the capillary tube $a^7$ and has an expanded lower end 4ª that normally rests between and makes contact with two platinum wires or points 5 in the cell $a^2$. The arrangement is such that when the mercury $f$ comes into connection with

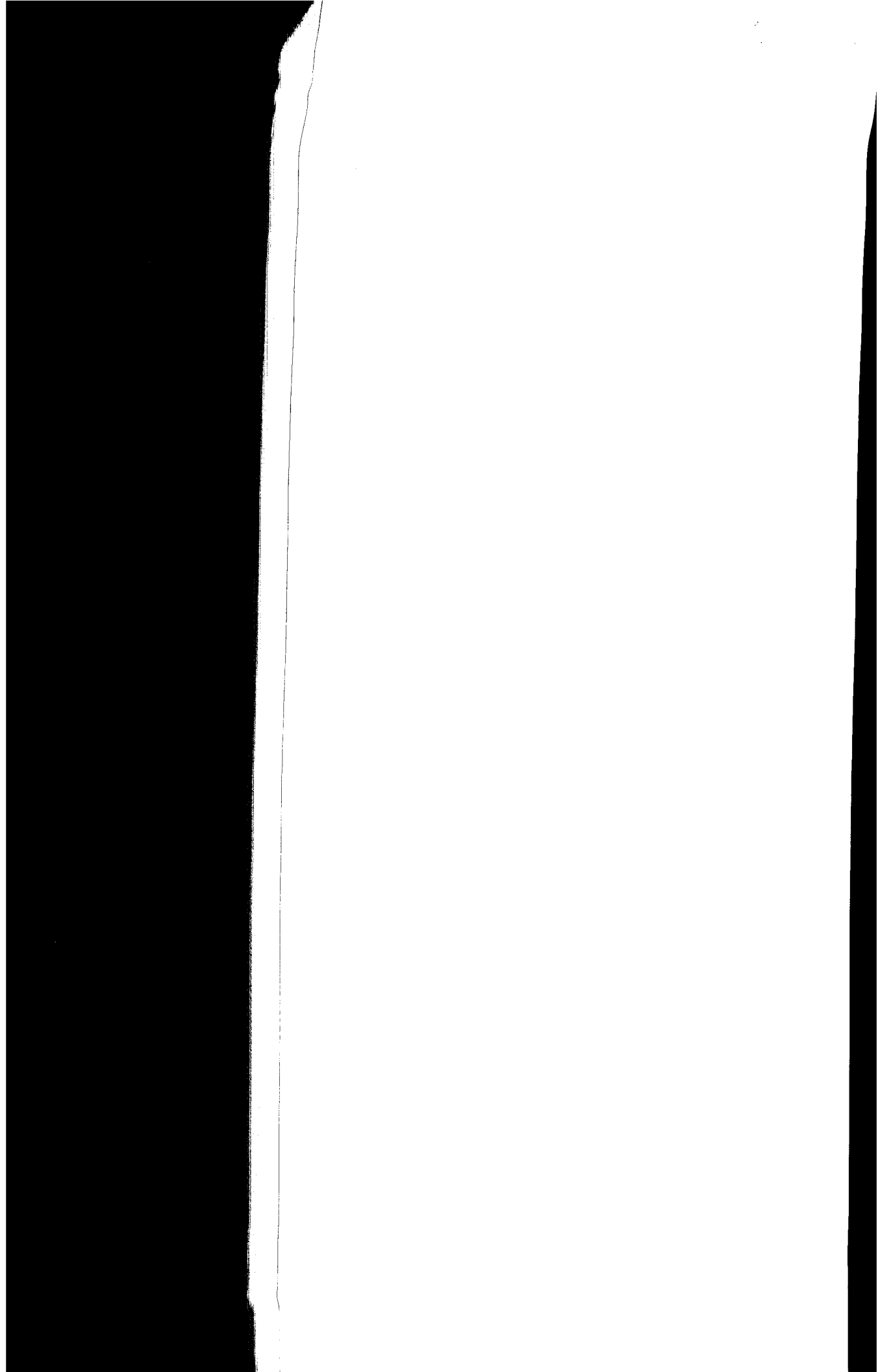

engage a pin or tooth on a wheel 16 and partly rotate the same in a forward direction. The armature lever $n^1$ corresponding to the second tube is similarly connected to another operating rod $15^a$ provided with a tooth or tappet adapted, each time it is raised, to engage a pin or tooth on the wheel 16 and partly rotate the same in a backward direction.

With the arrangement just described, when no current is passing to the lamp circuit, the switch or contact maker $w$, $w^1$, $x$ is open and the shunt resistance $s^3$ is disconnected from the positive supply main $k^1$ so that neither of the electrolytic cells will then be in use. When current passes to the lamp circuit and through the main shunting resistance $t$, the contact maker $w$, $w^1$, $x^1$ will be closed and the resistance $s^3$ connected to the positive main $k^1$ whereupon the two cells will be brought into action, the first or accelerating cell working at a rate that increases with the current supplied to the lighting circuit while the second or right hand cell will work at a slower rate for the reason that the voltage across the mains through the second or right hand cell, on the consumption side of the main shunting resistance $t$, is less than across the mains through the first or accelerating cell, on the dynamo side of the said main shunting resistance, so that the electro-magnetic device $m$ $n$ $n^1$ corresponding to the first tube will be brought into action to operate the wheel 16 and connected mechanism in a forward direction oftener than the electro-magnetic device $m$ $n$ $n^1$ corresponding to the second tube will be brought into action to operate the said mechanism in a backward direction, the extent to which the mechanism is moved forward in any given time corresponding to the difference in the rate of working of the two cells, and therefore to the current supplied. Any variation in voltage across the supply mains will affect both cells alike and will consequently not affect the relative rate of working of the cells and electro-magnetic devices. Each time the armature lever $n^1$ of either of the electro-magnetic devices is raised, it will close the circuit of the solenoid $m^1$ which then energizes its core $m^2$ and attracts the iron cores 14 in the two tubes so as to operate the contact levers 8 and move the contacts 6 away from the contacts 7 against which they normally bear under the action of the weight of the cores. A spark will thereby be produced, by the inductive action of the solenoid $m^1$, between the contacts 6 and 7 in the tube corresponding to the electro-magnetic device whose armature lever $n^1$ has closed the circuit of the said solenoid, whereupon the evolved gases in the tube will be ignited and recombined and the various parts will return to their normal positions to be again operated as before when the predetermined volume of gases is again evolved.

In order to prevent any difference in pressure in the two tubes $a$ $a^1$, the two end portions $a^3$ of such tubes may be connected together by a small tube $a^*$.

Figs. 6 to 10 inclusive show an arrangement such as shown in Fig. 5 adapted to form an electricity meter, the pin or toothed wheel 16 of the mechanism arranged to be operated by rods 15, $15^a$ of the two electromagnetic devices $m$ $n$ $n^1$ being arranged to drive the recording or counting mechanism 17 of the meter. The various parts of such meter corresponding to those in the arrangement shown in Fig. 5, are marked with similar reference letters. Each bent electrolytic tube $a$ $a^1$ is preferably made as shown more clearly in Fig. 8, its end portion $a^2$ being inclined upwardly and outwardly and connected by the capillary bore $a^4$ to the portion of the tube containing the main mass of the mercury $f$, which is vertical and connected by the capillary bore $a^5$, also containing mercury, to a bulb $a^6$ which also contains mercury and through the wall of which the contact $g$ passes. $e^1$ is a small tube of platinum fused into the tube at the junction of the bore $a^5$ with the part of the tube containing the main mass of mercury $f$, for effecting the fluid tight joint between the tube and mercury for the purpose hereinbefore described. The end portion $a^3$ of the tube $a$ $a^1$ is provided with a vertically adjustable contact $h$ to which is fixed a carrier $h^*$ of insulating material in which is supported a vertically movable contact $h^2$ which acts as a float when the mercury rises sufficiently high in the said end of the tube, and is thereby caused to bear against the contact $h$ to complete the circuit of the corresponding electro-magnetic device $m$ $n$ $n^1$. The two tubes $a$ $a^1$ are arranged parallel to each other on a support 18 with the main shunting resistance $t$ and solenoid $m^1$ between them, the core $m^2$ of the solenoid $m^1$ extending behind the upper portion $a^2$ of the two tubes. The electro-magnets $m$, $m$ are secured to a carrier 19 fixed to the base 20 of the instrument, the armature levers $n^1$ being pivoted to the carrier 19 and carrying the contacts 11 for making connections, when raised, with the contacts 12 connected to one end of the solenoid $m^1$. Each of the rods 15, $15^a$ is made as a spring rod that is held clear of the teeth on the pin wheel 16 by a guide pin 21 but has its tappet 22 arranged to engage a tooth on the pin wheel 16 (Figs. 9 and 10) each time the rod is raised. 23 (Fig. 9) is a spring detent that holds the pin wheel 16 in position when not operated by either of the tappets 22, and it also serves to prevent the wheel 16 being jerked around more than one tooth at a time.

In the modified arrangement shown in

Fig. 11, the parallel shunt resistances $s$, $s^5$ are arranged to be connected to the positive main $k^1$ at opposite sides of the main shunting resistance $t$ by circuit makers 24 and 25, operated by the core $v$ of the main shunting resistance $t$ when current is being supplied to the lamp circuit, the shunt resistance $s^3$ being connected to the negative main $k^2$. The winding of each electro-magnet $m$ has one end connected to the contact $h$ of the corresponding electrolytic tube $a$ $a^1$, as in Fig. 5, but its other end is connected to the fixed contact 7 of the pair of sparking contacts 6, 7 of the same tube, the movable contact 6 being connected to the positive main $k^1$ and the core $m^3$ of the magnet having one end thereof arranged near to the iron core 14 of the lever 8 carrying the said contact 6. By this arrangement a spark will be produced only in that tube in which sufficient gases have been evolved to close the circuit of the corresponding electro-magnet across the mains through the contacts $g$ and $h$ and interposed mercury $f$. Furthermore, should the gases fail to be ignited when the contacts 6, 7 are moved apart, contact 6 upon again bearing against contact 7 will again close the circuit of the electro-magnet $m$ which will again separate the contacts and produce a spark, these operations being repeated, if necessary, until the gases are ignited and recombined.

The pressure of the gases evolved electrolytically as hereinbefore described, may as shown in Fig. 12 be used to operate a body other than a column of mercury $f$, as for example a flexible diaphragm $f^1$ secured in a gas tight manner at its periphery to the tube in such a position, as for example at the bottom or end thereof remote from the end constituting the electrolytic cell $a^2$, that any gases caught by it will be enabled to rise again into the top of the cell to be there ignited. The diaphragm by its movement is arranged to complete an electric circuit, as between contacts $g^1$ and $h^x$ for the purposes hereinbefore set forth. Such a diaphragm is included in the claims under the generic term piston.

Prepayment mechanism of any known or suitable kind can be used in conjunction with electrolytic meters of the kind herein described.

The details of construction of apparatus according to the invention can be variously modified.

What I claim is:—

1. An electrolytic device comprising a tube having an electrolytic cell at one end, a movable piston arranged between the electrolyte and the other end of the said tube and subject to the pressure of the electrolytically evolved gases, and a fluid tight metallic joint between said tube and piston.

2. An electrolytic device comprising a tube having an electrolytic cell, a movable piston subject to the pressure of the evolved gases and formed by a column of mercury and means for producing a fluid tight joint between the mercury and the inner surface of the tube for the purpose set forth.

3. An electrolytic device comprising a tube having an electrolytic cell, a movable piston subject to the pressure of the evolved gases and formed by a column of mercury, and one or more annular pieces of metal capable of forming a fluid tight joint between the mercury and the inner surface of the tube.

4. An electrolytic device comprising a tube having an electrolytic cell, a column of mercury and a high resistance composed of a fine column of liquid between the mercury and said cell and means for rendering the mercury electro-negative to the cell.

5. An electrolytic device comprising a tube having at one part an electrolytic cell, at another part a column of mercury, a negative contact extending into said mercury, and between the cell and mercury a capillary bore filled with a fine thread or column of the electrolyte.

6. An electrolytic device comprising a tube having at one part an electrolytic cell, at another part a contact chamber, at an intermediate part a column of mercury and between the column of mercury and electrolytic cell a capillary bore charged with electrolyte, and a negative contact extending into said mercury.

7. An electrolytic device comprising a tube having at one end a closed electrolytic cell provided with gas igniting means and at the other end a gas chamber provided with contact means extending to the exterior of the tube, a column of mercury in an intermediate portion of the tube, a capillary bore charged with electrolyte between the cell and mercury, and a metal contact extending into said mercury.

8. An electrolytic device comprising a tube having at one end a closed electrolytic cell provided with gas igniting means and at the other end a closed gas chamber provided with contact means extending to the exterior of the tube, a column of mercury in an intermediate portion of the tube, one or more platinum rings, arranged to form a fluid tight joint between the mercury and the inner surface of the tube, a capillary bore charged with electrolyte between the electrolytic cell and mercury, and a metal contact extending into the mercury.

9. An electrolytic device comprising a bent tube having two legs one of which has a part adapted to form an electrolytic cell and the other has a part adapted to form a contact chamber provided with a contact device, the said tube having contracted portions at opposite ends of an intermediate portion thereof, one or more platinum rings in close contact with the inner surface of said intermediate portion of tube, a column of mercury confined in place within said intermediate portion of the tube, and in close contact with said platinum ring or rings, a column of electrolyte in one of said contracted portions of tube to form a high resistance between the mercury and the electrolytic cell, and a contact extending through the wall of said intermediate portion of the tube and into the mercury therein.

10. An electrolytic device comprising a bent tube having an electrolytic cell and gas igniting means at one end, a mercury holder at an intermediate part of its length and a coiled or twisted portion arranged between said cell and mercury holder and formed with a capillary bore.

11. An electrolytic device comprising a bent tube having an electrolytic cell and gas igniting means at one end, a gas chamber at the other end, a mercury container at an intermediate portion of its length, a coiled or twisted portion having a capillary bore between said cell and mercury holder, and a contracted bore between said mercury holder and gas chamber.

12. In electrolytic apparatus, the combination of a shunt arrangement comprising a main shunting resistance adapted to be placed in circuit with one of a pair of supply mains, two similar parallel resistances connected together and to the opposite ends of the main shunting resistance, and a main high resistance arranged to connect each of the parallel resistances to the other supply main, two similar electrolytic devices each having its electrolytic cell arranged to be connected in shunt across one of the parallel resistances and provided with gas igniting means, each of said parallel resistances having a voltage drop greater than the back E. M. F. of the electrolytic cell connected across its ends, two electro-magnetic devices corresponding to the electrolytic devices and each adapted to be brought into action by the gases evolved in the corresponding electrolytic cell to operate its gas igniting means, and mechanism common to the two electro-magnetic devices and upon which the said electro-magnetic devices are arranged to act differentially.

13. In electrolytic apparatus, the combination of a shunt arrangement comprising a main shunting resistance adapted to be placed in circuit with one of a pair of supply mains, two similar parallel resistances connected together and to the opposite ends of the main shunting resistance, and a main high resistance arranged to connect each of the parallel resistances to the other supply main, two similar electrolytic devices each having its electrolytic cell arranged to be connected in shunt across one of the parallel resistances and provided with gas igniting means, each of said parallel resistances having a voltage drop greater than the back E. M. F. of the electrolytic cell connected across its ends, a high resistance arranged in the shunt circuit of each electrolytic cell, two electro-magnetic devices corresponding to the electrolytic devices and each adapted to be brought into action by the gases evolved in the corresponding electrolytic cell to operate its gas igniting means, and mechanism common to the two electro-magnetic devices and upon which the said electro-magnetic devices are arranged to act differentially.

14. In electrolytic apparatus, the combination of a shunt arrangement comprising a main shunting resistance adapted to be placed in circuit with one of a pair of supply mains, two similar parallel resistances connected together and to the opposite ends of the main shunting resistance, and a main high resistance arranged to connect each of the parallel resistances to the other supply main, two similar electrolytic devices each having its electrolytic cell arranged to be connected in shunt across one of the parallel resistances and provided with gas igniting means, each of said parallel resistances having a voltage drop greater than the back E. M. F. of the electrolytic cell connected across its ends, a high resistance arranged in the shunt circuit of each electrolytic cell, switch mechanism adapted to close the circuits of the two electrolytic cells when current flows through the main shunting resistance, two electro-magnetic devices corresponding to the electrolytic devices and each adapted to be brought into action by the gases evolved in the corresponding electrolytic cell to operate its gas igniting means and mechanism common to the two electro-magnetic devices and upon which the said electro-magnetic devices are arranged to act differentially.

Signed at London England this thirtieth day of December 1908.

WILFRED BERTRAM THORPE.

Witnesses:
H. D. JAMESON,
CHARLES COPS.